May 22, 1923.
A. G. NEWMAN
FEED CUTTER
Filed Sept. 27, 1921
1,456,034
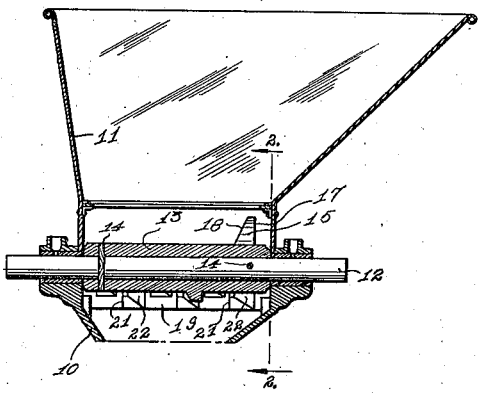
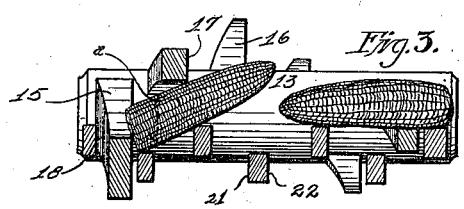
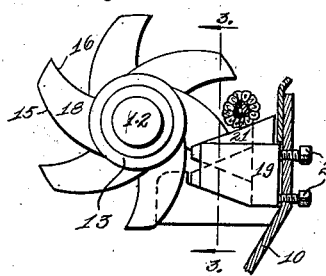
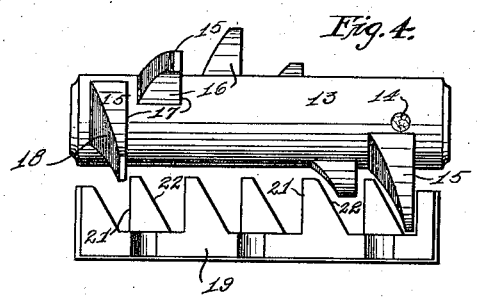
Inventor
Albert G. Newman
By Orwig & Hague Attys.

Patented May 22, 1923.

1,456,034

UNITED STATES PATENT OFFICE.

ALBERT G. NEWMAN, OF STANHOPE, IOWA.

FEED CUTTER.

Application filed September 27, 1921. Serial No. 503,646.

*To all whom it may concern:*

Be it known that I, ALBERT G. NEWMAN, a citizen of the United States, and a resident of Stanhope, in the county of Hamilton and State of Iowa, have invented a certain new and useful Feed Cutter, of which the following is a specification.

The object of my invention is to provide a feed cutter of simple, durable and inexpensive construction, comprising an ear corn cutting device designed for cutting the ears into small pieces where it is desired to grind both the cob and the ear of corn together, and in this connection it is my object to provide an ear corn cutting device that will sever the ears of corn with a drawing cutting action as distinguished from a pressing action, and also provide for cutting ears of corn into comparatively small parts of irregular or substantially triangular shape as distinguished from such devices as cut ears of corn into small, approximately cylindrical pieces, to thereby deliver the small portions of ears of corn to the grinding mechanism in such condition that the said pieces of the ears of corn can readily and easily enter the grinding mechanism, and whereby this part of the device may be run and operated with a minimum of applied power. And further in this connection, it is my object to provide means for adjusting these ear corn cutting devices relative to each other to take up wear and for other purposes.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a vertical sectional view of a feed cutter embodying my invention.

Figure 2 shows a sectional view on line 2—2 of Figure 1.

Figure 3 shows a vertical sectional view on the line 3—3 of Figure 2.

Figure 4 shows a top or plan view of the part illustrated in Figure 2, and

Figure 5 shows a perspective view of a portion of an ear of corn illustrating the shape of the portions which are cut from the ears of corn by my improved cutter.

Referring to the accompanying drawings I have used the numeral 10 to indicate that part of the frame of the machine shown. At its top is the receiving hopper 11 and mounted in the machine frame is the main shaft 12. The means for driving this shaft is not illustrated. Beneath the hopper is the cylinder 13 mounted upon the shaft 12 to which it is preferably connected by a breakable pin 14. On this cylinder is a series of cutting teeth or blades 15. These are arranged spirally around the cylinder, as clearly shown in Figure 4. Each tooth is curved on its advance side in a concave manner as shown at 16 in Figure 2. Each tooth also has one side that extends straight out at right angles to the cylinder 13 as illustrated at 17 in Figure 4. The other side is beveled or inclined as shown at 18 in Figure 4 thus forming a tooth having a maximum width at the base where it unites with the cylinder and a minimum width at its outer end.

The stationary ear corn cutting member may be cast complete in one piece, and comprises a body portion 19 adjustably and detachably connected to the frame by means of the bolts 20. Projecting inwardly from the body portion 19 is a series of cutting blades to coact with the cutting blades of the rotary member. Each alternate blade is elevated a considerable distance above the intervening blades, as clearly shown in Figure 3, and by dotted lines in Figure 2, and each blade has its top surface inclined downwardly and toward the shaft 13, as shown in Figure 2. Each blade also has one straight side projecting at right angles to the body portion 19, as indicated by the numeral 21 in Figure 4, and the other side 22 is beveled or inclined to form a cutting blade of a maximum width at its end adjacent to the body 19 and a minimum width at its end adjacent to the cylinder 13, the straight side 21 is designed to coact with the straight side 17 of the rotary blades and the beveled side 22 is designed to coact with the beveled side 18.

The practical operation of this part of my feed grinding machine is as follows:

Assuming that the hopper is filled with ears of corn and it is desired to grind the corn and the cob all together, then the curved rotary blades will grasp the ears of corn and carry them to the position resting on top of the stationary cutting blades in the position shown in Figure 3, and the ears will first lay flat upon the two nearest high stationary blades, as shown at the right in Figure 4. Then when one of the rotary blades descends it will sheer off a portion of the ear, making a beveled or inclined cut across the ear so that the fragment of the ear that is removed will be of substantially the shape shown in Figure 5.

When this has been done, the ear of corn will then tilt downwardly to the position shown at the left in Figure 3, and then when the next rotary cutting blade passes down through the ear, it will cut off at the end of the ear along the dotted line "a" as shown in Figure 3 so that the severed portion will also be of substantially the shape shown in Figure 5, and this process will be repeated during the operation of the machine.

Furthermore, the ears will be severed by a drawing cut because the curved rotary arms will grasp the ears and draw them inward and downward during the cutting stroke.

I claim as my invention:

In a feed cutting mill, a device for cutting ears of corn or the like comprising a rotary body portion, a series of cutting blades extending outwardly from said body portion and said blades being arranged spirally around the body portion, a stationary coacting cutting member comprising a body portion and a series of blades, the alternate ones of said blades being elevated above the other, said parts being so arranged and proportioned that when an ear of corn or the like enters between the blades, one of the rotating blades will first engage the ear of corn and tilt it to position so that part of the ear of corn is resting upon the lower stationary blades and a part on one of the upper stationary blades so that when the cut is completed the ear will be cut through at an angle divergent to a line at right angles to the longitudinal axis of the ear of corn.

Des Moines, Iowa, July 11, 1921.

ALBERT G. NEWMAN.